United States Patent
Kostiainen et al.

(10) Patent No.: US 7,421,269 B2
(45) Date of Patent: Sep. 2, 2008

(54) FUNCTIONAL COVER FOR USE WITH A WIRELESS TERMINAL

(75) Inventors: Pekka Kostiainen, Helsinki (FI); Kenn Berend Pedersen, Fakse Ladeplads (DK); Henrik Pedersen, Smoerum (DK)

(73) Assignee: Nokia Corporation (FI)

( * ) Notice: Subject to any disclaimer, the term of this patent is extended or adjusted under 35 U.S.C. 154(b) by 385 days.

(21) Appl. No.: 10/085,010

(22) Filed: Mar. 1, 2002

(65) Prior Publication Data
US 2004/0203499 A1 Oct. 14, 2004

(51) Int. Cl.
*H04M 3/00* (2006.01)
(52) U.S. Cl. .................. 455/418; 455/550.1; 455/575.1; 455/575.8; 379/433.04; 379/433.07; 379/433.13
(58) Field of Classification Search ................. 455/418, 455/550.1, 575.1, 575.8; 379/433.04, 433.07, 379/433.13
See application file for complete search history.

(56) References Cited

U.S. PATENT DOCUMENTS

| | | | | |
|---|---|---|---|---|
| 5,023,936 A | * | 6/1991 | Szczutkowski et al. | 455/90.2 |
| 5,077,832 A | * | 12/1991 | Szczutkowski et al. | 455/566 |
| 5,848,152 A | * | 12/1998 | Slipy et al. | 379/433.13 |
| 5,911,121 A | * | 6/1999 | Andrews | 455/418 |
| 6,456,039 B1 | | 9/2002 | Lauper et al. | |
| 7,136,048 B2 | * | 11/2006 | Yrjanainen et al. | 345/173 |
| 2005/0090280 A1 | * | 4/2005 | Nielsen | 455/550.1 |

FOREIGN PATENT DOCUMENTS

| | | |
|---|---|---|
| EP | 1 091 540 A2 | 4/2001 |
| EP | 1091540 A2 * | 4/2001 |
| WO | WO 01/86922 A1 | 11/2001 |
| WO | WO 01/91425 A1 | 11/2001 |

* cited by examiner

*Primary Examiner*—Sanh D Phu
(74) *Attorney, Agent, or Firm*—Alston & Bird LLP

(57) ABSTRACT

A wireless communication terminal has a user exchangeable cover part. The wireless communication terminal and user exchangeable cover part are electrically interconnected by means of an electrical connector. The user exchangeable cover part comprises identification means. The user exchangeable cover part has electrical circuitry for supporting a user interface of the wireless terminal. The wireless terminal identifies the user exchangeable cover part by detecting the identification means. The wireless terminal operates the electrical circuitry of the user exchangeable cover part in dependence of the identification of user exchangeable cover part.

21 Claims, 6 Drawing Sheets

FUNCTIONAL COVER FOR USE WITH A WIRELESS TERMINAL

BACKGROUND OF THE INVENTION

The invention relates to a functional cover for use with a wireless terminal, such as a cellular phone. Such covers includes functionality that is implemented by adding electronics to the cover. The invention furthermore relates to the mechanical and the electrical interface between a functional cover and a wireless terminal.

SUMMARY OF THE INVENTION

According to a first aspect of the invention there is provided a method for operating electrical circuitry included in an exchangeable cover part for supporting a user interface of the wireless terminal. The wireless communication terminal and the user exchangeable cover part are electrically interconnected by means of a electrical connector, and the method includes identification of the type of the user exchangeable cover part, and operating of the electric circuitry of the user exchangeable cover part in dependence of the identification of user exchangeable cover part. Hereby the wireless terminal is able to identify the type of the cover in a booting routine and afterwards operate the cover according to this. The cover may have special illumination effects, special game keys, special memories for playing music or playing games.

Preferably the connector has a plurality of pins, and at least one of the connector pins is operated in an identification state for sensing a resistor value included in the identification means, and afterwards in an operation state for operating the electric circuitry of the user exchangeable cover part.

According to a preferred embodiment of the invention, the operation state is a frequency mode for directing an electrical representation of a ringing signal to the electric circuitry for providing an illumination effect following the ringing signal.

According to a further aspect, the invention relates to wireless communication terminal having an user exchangeable cover part, wherein the wireless communication terminal and user exchangeable cover part are electrically interconnected by means of a electrical connecter. The user exchangeable cover part comprises identification means, and an electric circuitry for supporting a user interface of the wireless terminal. The wireless terminal identifies the user exchangeable cover part by detecting the identification means; and operates the electric circuitry of the user exchangeable cover part in dependence of the identification of user exchangeable cover part.

Preferably, the connector includes a plurality of connector pins arranged in line an in equal distance. Advantageously, the connector pins are arranged at the rear side of the cover part. According to a preferred embodiment of the invention, the number of connector pins is three. According to a further embodiment of the invention, the number of connector pins is five.

Preferably, at least one of the connector pins is operated in an identification state for sensing a resistor value included in the identification means, and afterwards in an operation state for operating the electric circuitry of the user exchangeable cover part.

In one implementation of the invention, the operation state is a frequency mode for directing an electrical representation of a ringing signal to the electric circuitry for providing an illumination effect synchronized with the ringing signal.

According to a further aspect of the invention there is provided an user exchangeable cover for releasable attachment to a wireless communication terminal, the user exchangeable cover has an electrical connector part for being electrically connected the wireless communication terminal in attached position. The user exchangeable cover comprises identification means, and an electric circuitry for supporting a user interface of the wireless terminal. The user exchangeable is adapted to allow the wireless terminal to operate the electric circuitry of the user exchangeable cover part in dependence of the identification of user exchangeable cover part.

BRIEF DESCRIPTION OF THE DRAWINGS

For a better understanding of the present invention and to understand how the same may be brought into effect reference will now be made, by way of example only, to accompanying drawings, in which:—

DETAILED DESCRIPTION OF THE INVENTION

Figure 1:
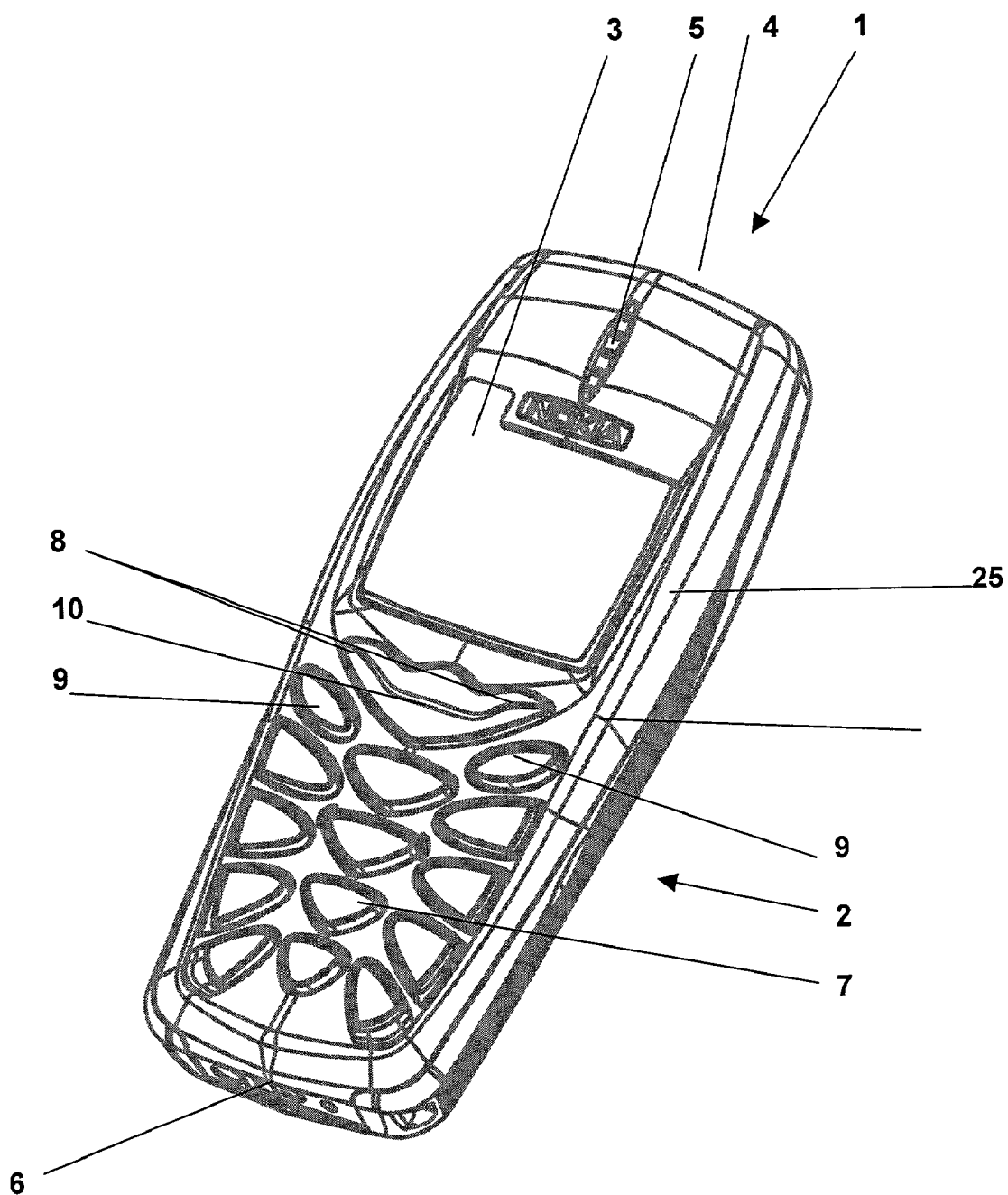
FIG. 1 schematically illustrates a preferred embodiment of a wireless telephone according to the invention.

FIG. 1 shows a preferred embodiment of a wireless terminal, such as a cellular phone 1, which comprises a user interface having a keypad 2, a display 3, an on/off button 4, a speaker 5 (only openings are shown), and a microphone 6 (only openings are shown).

According to the preferred embodiment of the invention, the keypad 2 has a first group 7 of keys as alphanumeric keys, two soft keys 8, and a scroll-key 10 (up/down) for moving a cursor in the display. Furthermore the keypad includes two call-handling keys 9 for initiating and terminating calls. The present functionality of the soft keys 8 is shown in a separate field in the bottom of the display 3 just above the soft keys 8.

Figure 2:
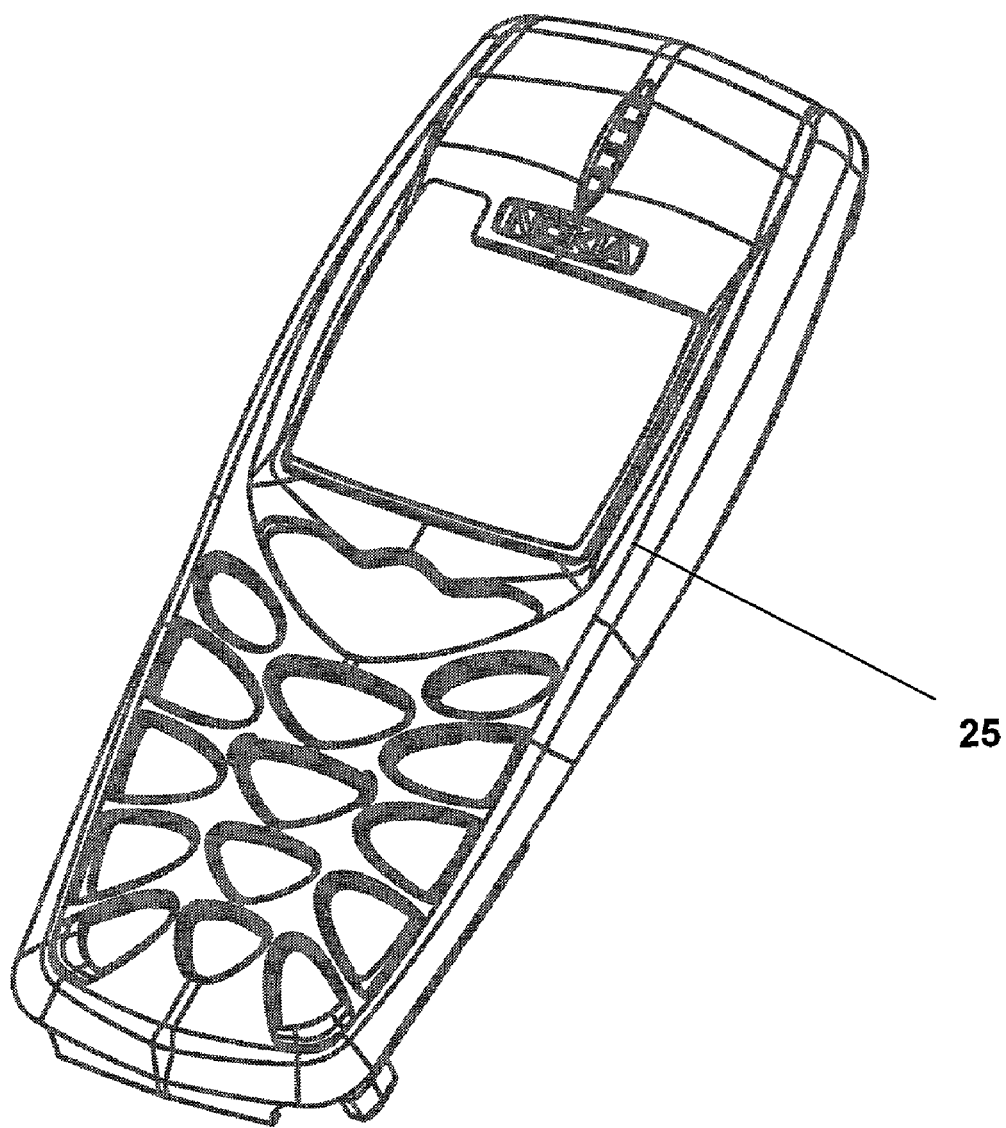
FIG. 2 schematically illustrates a functional front cover for the wireless telephone shown in FIG. 1.

The cellular phonel has an exchangeable functional front cover 25. An exchangeable front cover is intended to be changed by the user himself without use of tools. Such an exchangeable front cover is disclosed in U.S. patent application Ser. No. 09/503,595 filed by the applicant and this disclosure is hereby incorporated by reference. FIG. 2 shows the exchangeable functional front cover 25 according to the invention.

Figure 3:
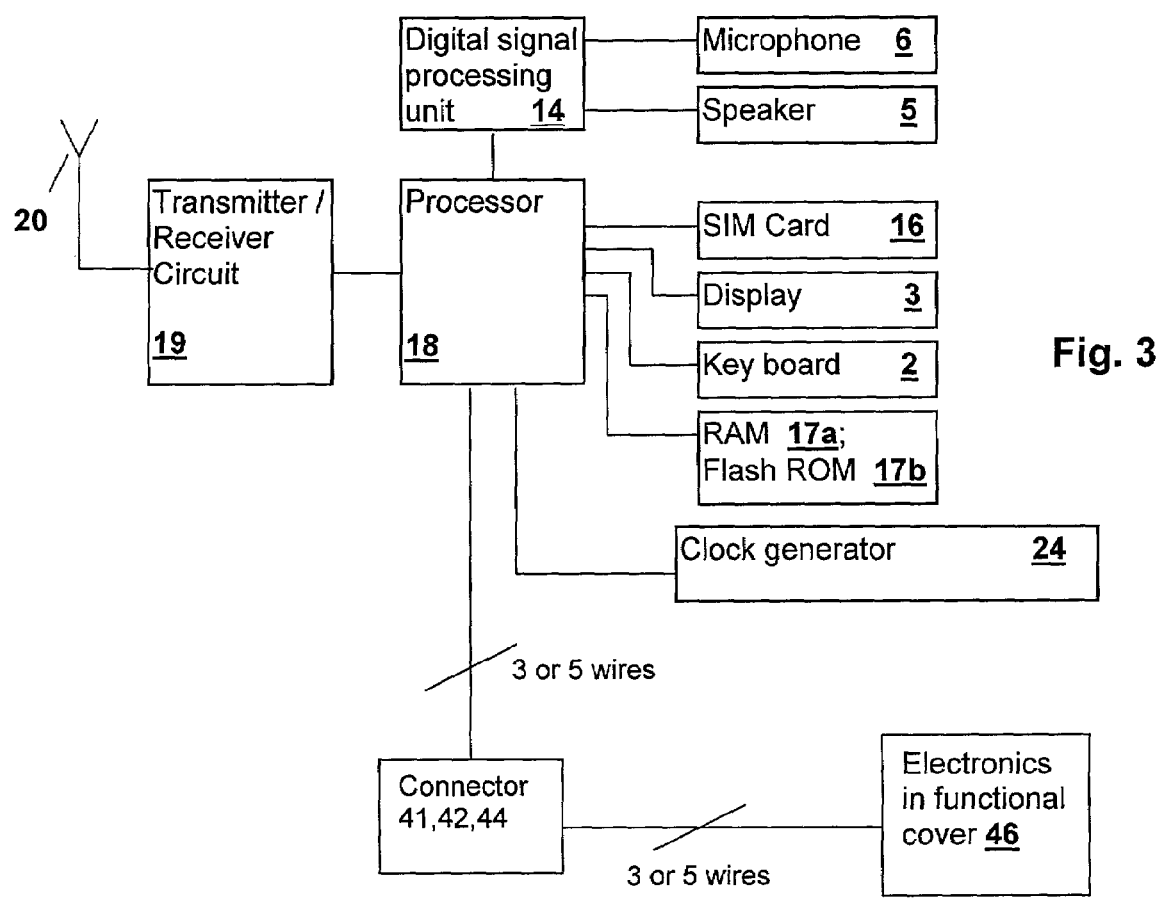
FIG. 3 schematically shows the essential parts of a wireless telephone for communication with for example a cellular network.

FIG. 3 schematically shows the most important parts of a preferred embodiment of the phone, the parts being essential to the understanding of the invention. A processor 18, which supports the GSM terminal software, also controls the communication with the network via the transmitter/receiver circuit 19 and an antenna 20.

The microphone 6 transforms the users speech into analog signals with the signals formed thereby being A/D converted in an A/D converter (not shown) before the speech is encoded in an audio part 14. The encoded speech signal is transferred to the processor 18. The processor 18 also forms the interface to a RAM memory 17a and a Flash ROM memory 17b, a SIM card 16, the display 3 and the keypad 2 (as well as data, power supply, etc.). The audio part 14 speech-decodes the signal, which is transferred from the processor 18 to the earpiece 5 via a D/A converter (not shown).

Furthermore a clock generator 24 supplies a clock signal to the processor 18. The processor 18 is via a three or five wire bus and a connector 41, 42, 44 connected to electronics 46 in the functional cover 25.

A functional cover 25 is a cover for a wireless terminal 1, which includes functionality that is implemented by adding electronics 46 to the cover 25. To give some examples, it may include an application reacting for example to the power supply or ringing tone. It can also be an application that provides input to the phone (for example a touch pad).

The interface between the functional cover and the phone will be described. Five different modes will be introduced, out of which three are very simple and can be used for example sensor applications. The remaining two are the generic asynchronous serial bus and a mode based on a synchronous data protocol.

The objective of the invention is not to provide a full specification of all the different operation modes, but to allow functional covers and transceivers to interact even through all the modes are not supported by both parts.

According to the preferred embodiment of the invention, the connector includes for three connector pins, a positive power supply voltage pin ($V_{DD}$), a negative power supply voltage pin ($V_{SS}$), and a Cover Type Indicator pin (CTI).

Preferably the CTI-pin (Cover Type Indicator) is a bi-directional and bi-mode (analogue/digital) signal pin. The CTI-pin is used for a frequency mode, a PWM-mode and a CTI-mode.

According to an alternative embodiment of the invention the connector includes five connector pins. Like the first embodiment, the connector includes a positive power supply voltage pin ($V_{DD}$), a negative power supply voltage pin ($V_{SS}$), and a Cover Type Indicator pin (CTI). Furthermore the connector includes a Data Signal pin and a Clock Signal pin.

The Data Signal pin is used for asynchronous data in data mode and in a synchronous data mode. The protocol for the synchronous data mode may be according to the I2C-Bus Specification, version 2.1, January 2000. The Clock Signal pin is used for the clock in synchronous data mode.

TABLE 1

Functional cover interface pins

| Pin | Output type | Description | Communication direction |
| --- | --- | --- | --- |
| Vdd | | Power supply | Tranceiver to Functional cover |
| Vss | | Ground | Transceiver to Functional cover |
| CTI | Analogue | Frequency output | Transceiver to Functional cover |
| | Digital | PWM output | Transceiver to Functional cover |
| | Analogue | Cover Type Indicator | Functional cover to Transceiver |
| | Digital | PWM input | Functional cover to Transceiver |
| Data | Digital | Asynchronous data output | Transceiver to Functional cover |
| | Digital | Synchronous data output | Transceiver to Functional cover |
| | Digital | Asynchronous data-input. | Functional cover to Transceiver |

TABLE 1-continued

Functional cover interface pins

| Pin | Output type | Description | Communication direction |
| --- | --- | --- | --- |
| | Digital | Synchronous data input | Functional cover to Transceiver |
| Clock | Digital | Clock output | Transceiver to Functional cover |
| | Digital | Clock input | Functional cover to Transceiver |

According to the invention, a baseband (BB) engine and a functional cover do not have to support all the modes. This means that the physical interface may comprise from three to five pins depending on the number of supported modes.

If the BB engine supports multiple modes, passive mode is not allowed to effect the active mode. This means for example, that when making the CTI measurement, other pins driving the CTI-pin must have high impedance. Furthermore the baseband engine must be able to drive $R_{CTI}$.

Figure 8:
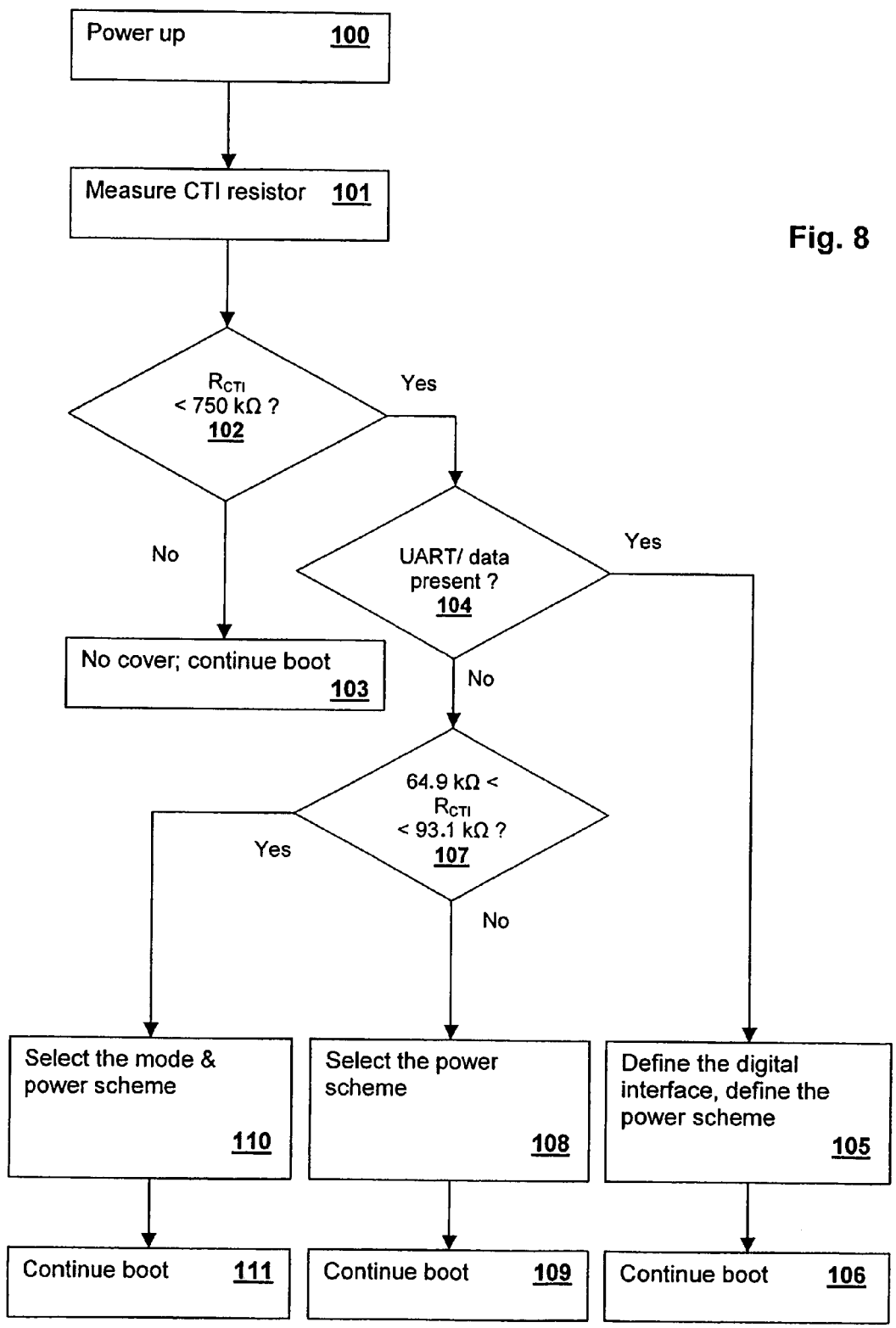
FIG. 8 shows a flow chart illustrating the booting and mode selection procedure according to the preferred embodiment of the invention.

When the wireless terminal 1 is switched on or the processor 18 detects that a new functional cover has been attached to the transceiver part, a boot sequence is initiated. During the boot sequence, the type of the cover is detected via the CTI signal. According to that information, the corresponding data mode is selected and the appropriate power supply level, $V_{dd}$, is supplied. An example of the boot sequence and mode determination process is presented in FIG. 8.

First is the power switched on to the phone in step 100. Then the size of the CTI-resistor, $R_{CTI}$, is measured in step 101. If the resistor measurement result in step 102 does not exceed a predetermined value (for example 750 k Ohm), the functional cover is deemed to be attached and a further investigation in order to identify the cover, has to be done. If the resistor measurement result in step 102 exceeds the first predetermined value, the functional cover is deemed to present. The booting in step 103 has to be continued with the presumption that the cover does not support the electric interface according to the invention.

If the processor 18 in step 104 identifies that the cover is "intelligent"—this means that the cover 25 has an asynchronous or synchronous data interface, further information will be exchanged via the digital interface in step 105. The digital interface and the power scheme has to be defined. Hereafter the booting with be continued in step 106.

If the cover in step 104 is deemed not to be "intelligent", the CTI-resistor, $R_{CTI}$, is compared with a second threshold (e.g.64.90 k Ohm) and a third threshold (e.g. 93.10 k Ohm), the cover 25 is deemed to have passive components only, and these component are powered by the power supply of the wireless terminal 1. The voltage is determined by the processor 18 in step 108 by means of a look up table. The booting is continued in step 109.

If the CTI-resistor, $R_{CTI}$, is falls outside the interval defined by the second and the third threshold, the cover 25 is deemed to be able to perform other modes as a pulse mode, a PWM mode or a frequency mode. The mode and power scheme is determined by the processor 18 in step 110 by means of a look up table. The booting is continued in step 111.

TABLE 2 mode supported in dependence of the impedance $R_{CTI}$.

| Mode | R_CTI value |
| --- | --- |
| Synchronous data mode | 2.00 kOhm |
| Asynchronous data mode | 6.65 kOhm |
| PWM data mode | 30.90 kOhm |
| | 45.30 kOhm |
| | 64.90 kOhm |

TABLE 2-continued mode supported in dependence of the impedance $R_{CTI}$.

| Mode | R_CTI value |
|---|---|
| CTI data mode | 93.10 kOhm |
| | 137.0 kOhm |
| Freq. data mode | 210.0 kOhm |
| | 357.0 kOhm |
| | 750.0 kOhm |
| NO COVER | ∞ |

Table 2 above describes the CTI resistor value $R_{CTI}$ vs. functionality conversion. The whole conversion range accordingly is preferably divided into a predetermined number of different sub-ranges. For the "intelligent" modes (synchronous and asynchronous), only one resistor value has been reserved, since all the needed additional information can be transferred via the interface. For PWM- and CTI-modes, two resistor values are reserved and for the Frequency-mode, four resistor values have been reserved.

The power control scheme is based on the CTI-information, which is defined in the table 2. The electrical parameters of the power supply includes the power supply voltage VDD, the output current IDD, the output impedance ZOUT of the wireless terminal 1, and the power on time and power off time.

Data Interface Synchronous Mode (Data and Clock pins)

The data specification used according to the invention may be a sub set of I2C-bus specification version 2.1 Jan. 2000 by Philips Semiconductors. In the synchronous data mode the data pin is used for transferring data between the wireless terminal 1 and the functional cover 25—usually under control of the processor 18 and the clock oscillator 24 associated therewith.

Data Interface Asynchronous Mode (Data Pin)

Data transferred in the asynchronous data mode may be based on an asynchronous half-duplex signal. The power supply may be in the level of $V_{DD}$=2.7V with a data rate up to 230 kbps.

As well the asynchronous data mode, the synchronous data mode may be used for loading data from multi-media memory card (MMC) like memories included in the functional cover 25 into the wireless terminal for being handled by means of the processor 18. Such a data connection may be used for loading data from multi-media memory card (MMC) like memories included in the functional cover 25 into the wireless terminal for being handled by means of the processor 18. These data may include, for example MP3 music files and executable games. It has become possible to provide a gaming cover—perhaps having an extra joy-stick whose operation is sensed by the gaming cover—transferred to the wireless terminal via the data pin. The game may also be run on an extra processor included in the functional cover 25, but using the display 3 of the wireless terminal 1. Extra UI units as a touch sensitive pad/screen or extra display may be provided on the functional cover 25 and controlled by the processor 18.

PWM Data Mode (via CTI-Pin)

Data is transferred using bi-directional CMOS level PWM-modulated CTI-signal. The power supply may be in the level of $V_{DD}$=2.7V. The pulse signal may have a variable frequency up to 32 kHz. The pulse duty cycle may be varied between 0.01 and 1. This is an analog signal in digital format, whereby sound can easily be transferred ref. buzzer signal.

CTI Data Mode (Via CTI-Pin)

The type information of the cover is given in the CTI. that is the processor 18 detects the value of the pull down resistor during the start-up (boot) of the phone and selects the right data and power interface mode according to the predefined table.

This mode is very applicable for applications that do not need any stimulus from the wireless terminal. A flashlight is a good example on such an application.

Frequency Mode (Via CTI-Pin)

In the frequency mode, the functional cover 25 is controlled with the frequency of the CTI-signal. Amplitude information is not needed. Therefore the driving signal can be a small analog voltage, which is then amplified in the cover end. The frequency signal may according to the preferred embodiment be variable up to 10 kHz.

This mode can be used to direct a ringing tone to the functional cover 25. Once there, it can be used as a stimulus, for example driving a "light organ".

The connector interface may comprise three to five pins and associated pads. The electrical requirements for different signal pins will probably be quite different. The CTI-pin will be used for low where as clock and data for medium bandwidth communication. For high bandwidth communication something more sophisticated is needed. As a result, the connector has to be designed according to optimizing the connector with regard to performance and cost.

The interface on the wireless terminal comprises three to five signal pads for interacting with a similar amount of pogo pins 41, which are included in the cover 25.

TABLE 3

Pin order and pad sizes

| Pin name | Pin no | A | D | Unit |
|---|---|---|---|---|
| CTI | 1. | 4.3 | 2 | mm |
| $V_{SS}$ | 2. | | | |
| $V_{DD}$ | 3. | | | |
| Data | 4. | | | |
| Clock | 5. | | | |

Figure 4:
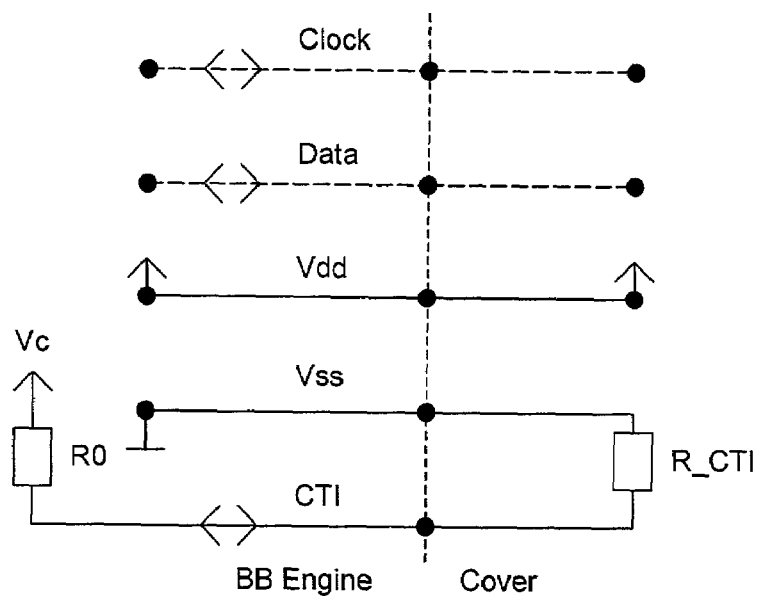
FIG. 4 shows electrical connection between the main block of a wireless telephone and a functional front cover according to preferred embodiments of the invention.
Figure 5:
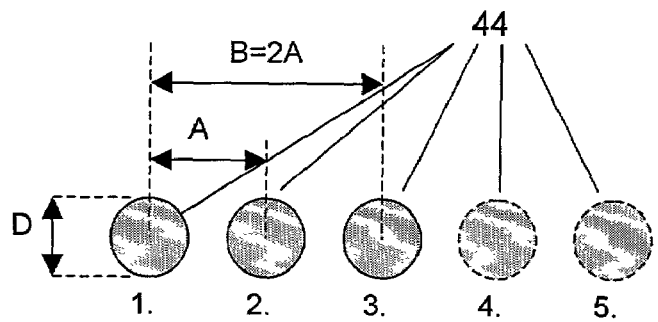
FIG. 5 shows the connection pad for connecting the wireless telephone and a functional front cover according to the preferred embodiment of the invention.
Figure 6:
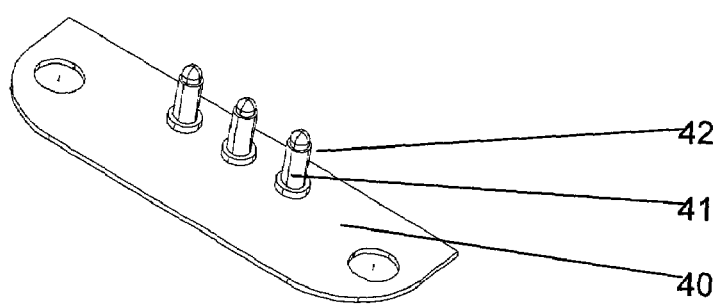
FIG. 6 shows the preferred embodiment for the connector part mounted in the functional cover according to the preferred embodiment of the invention.

The order of the pins appears from FIGS. 4 and 5. The pins 41 are arranged in a line in equal distance, A. The diameter, D, of the five pads 44 is substantially greater than the diameter of the plungers 42 of the pins 41 in order to ensure a reliable connection.

It shall be noted that the wireless terminal 1 may have five pads 44. If the functional cover does not support the data modes, only three pins 41 are needed, and these three pins 41 engage the pad 44 corresponding to pins no 1-3.

The connector according to the preferred embodiment of the invention comprises three Pogo-pins 41 (spring-loaded contacts) mounted on a rigid Printed Wiring Board 40.

The pogo-pins 41 are mechanically fixed and soldered on the printed wiring board 42 in order to maintain safe and low resistance contact between phone's main printed wiring board and functional cover's small rigid printed wiring board 40. Plunger 42 should travel at least 1 mm and the pressure force between plunger and main printed wiring board's pads should be minimum 25 g for use in a standard wireless terminal. The pad dimensions and spacing are given in table 3 above.

Pins may advantageously be gold plated and their internal resistance has to be specified according to the application. Preferably the internal resistance does exceed 100 mΩ even after 10000 cycles.

Figure 7:
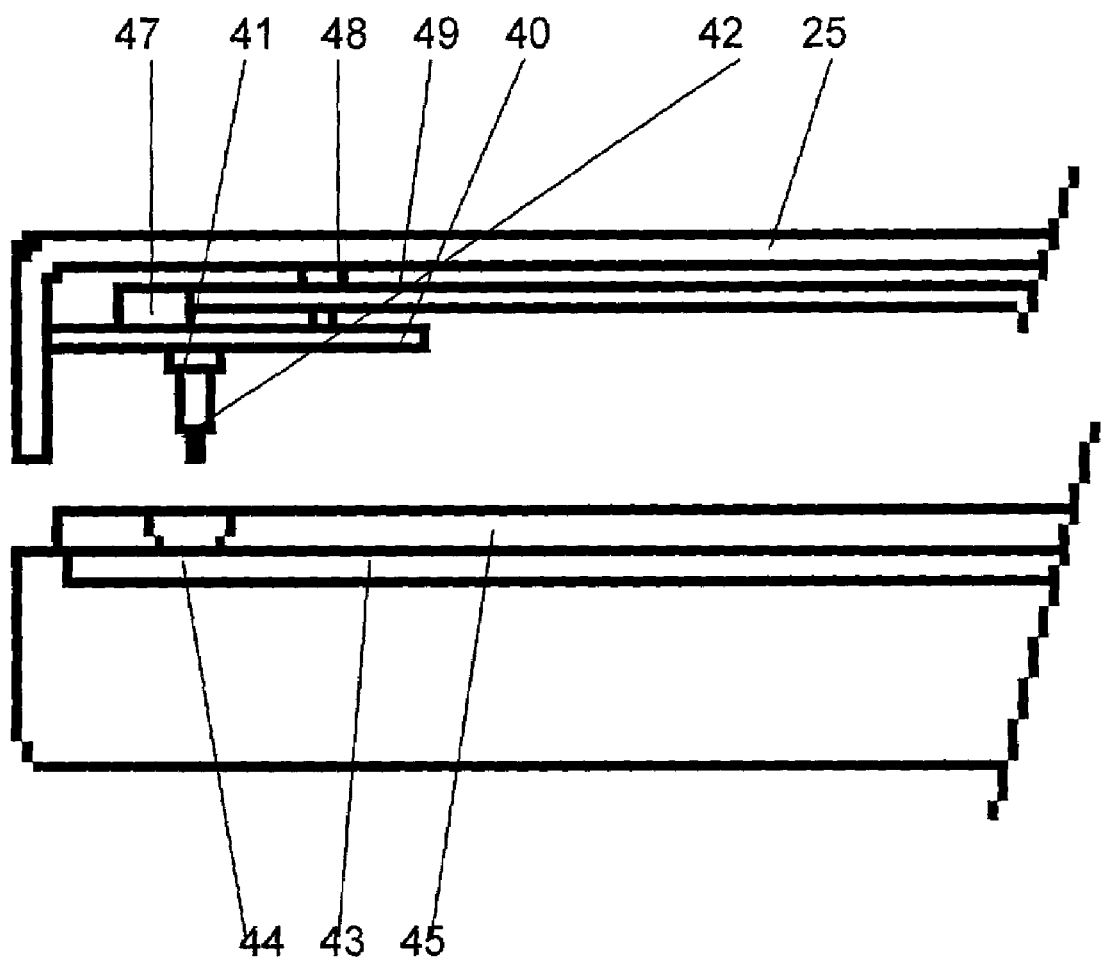
FIG. 7 shows schematically in partial cross section the connector part connecting the main block of a wireless telephone and a functional front cover according to the preferred embodiments of the invention.

FIG. 7 shows the wireless terminal 1 with the front cover 25 lifted. The pads 44 are arranged on the printed wiring board 43 of the terminal. The printed wiring board 43 is covered by a light guide 45 of transparent plastic has openings allowing the connector pins 41 and 42 to access the pads. The connector pins 41 and 42 are mounted on a printed wiring board 40.

The printed wiring board 40 is mounted on the inner side of the cover 25 by means of snap coupling means 48. On the rear side of the printed wiring board 40, there is provided an electric circuitry including for example three LED's 47 illuminating respective pipe formed light-guides 49. In the frequency mode an electrical representation of a ringing signal is directed to the electric circuitry for providing an illumination effect following the ringing signal. The light-guides 49 may be illuminated individually in a tempo following the ringing signal. This gives an exciting effect for the user when the functional cover 25 is partly transparent.

What is claimed is:

1. A method of operating electrical circuitry included in an user exchangeable cover part that is electrically interconnected to a wireless terminal by an electrical connector, the method comprising:
   identifying a class of a user exchangeable cover part; and
   operating the electrical circuitry of the user exchangeable cover part in dependence upon an identification of the user exchangeable cover part,
   wherein the electrical circuitry that is operated in dependence upon the identification of the user exchangeable cover part comprises circuitry for supporting a user interface of the wireless terminal and circuitry in addition to or other than circuitry included within a display screen of the user interface, and
   wherein the connector has a plurality of pins, and at least one of the connector pins is operated in an identification state for sensing a circuit element value included in an identification unit configured to identify the class of the user exchangeable cover part and which is part of the user exchangeable cover part, and afterwards is operated in an operation state for transferring electrical signals between the wireless terminal and the electrical circuitry of the user exchangeable cover part.

2. A method according to claim 1, wherein the operation state is a frequency mode for directing an electrical representation of a ringing signal to the electrical circuitry for providing an illumination effect by the cover part following the ringing signal.

3. A method according to claim 1 wherein at least one of the connector pins is operated in an identification state for sensing a resistor element value included in the identification unit.

4. A wireless communication terminal comprising a user exchangeable cover part and a display screen, wherein the wireless communication terminal and user exchangeable cover part are electrically interconnected by an electrical connector wherein:
   the user exchangeable cover part comprises an identification unit configured to identify the cover part, and electrical circuitry for supporting a user interface of the wireless terminal, the electrical circuitry comprising circuitry in addition to or other than electrical circuitry included within the display screen;
   the wireless terminal is configured to identify the user exchangeable cover part by detecting the identification unit
   the wireless terminal is configured to operate the electrical circuitry of the user exchangeable cover part, including the circuitry for supporting the user interface, in dependence upon the identification unit of the user exchangeable cover part;
   the connector includes a plurality of connector pins arranged in line and separated by an equal distance; and
   at least one of the connector pins is configured to be operated in an identification state for sensing a circuit element value included in the identification unit, and in an operation state for transferring electrical signals between the wireless terminal and the electrical circuitry of the user exchangeable cover part.

5. A wireless communication terminal according to claim 4, wherein the connector pins are arranged at a rear side of the cover part.

6. A wireless communication terminal according to claim 5, wherein a number of the connector pins is three.

7. A wireless communication terminal according to claim 5, wherein a number of the connector pins is five.

8. A wireless communication terminal according to claim 4, wherein the operation state is a frequency mode for directing an electrical representation of a ringing signal to the electrical circuitry for providing an illumination effect synchronized with the ringing signal.

9. A wireless communication terminal according to claim 4 wherein at least one of the connector pins is configured to be operated in an identification state for sensing a resistor element value included in the identification unit.

10. A user exchangeable cover part comprising:
    an electrical connector part for electrically connecting to a wireless communication terminal in an attached position including an identification unit configured to identify the cover part; and
    electrical circuitry for supporting a user interface of the wireless terminal, the electrical circuitry comprising circuitry in addition to or other than electrical circuitry included within the display screen,
    wherein the user exchangeable cover part allows the wireless communication terminal to operate the electrical circuitry of the user exchangeable cover part, including the electrical circuitry for supporting the user interface, in dependence upon the identification unit of the user exchangeable cover part; and
    wherein the connector part is configured to be operated in an identification state for sensing a circuit element value included in the identification unit, and in an operation state for transferring electrical signals between the wireless terminal and the electrical circuitry of the user exchangeable cover part.

11. A user exchangeable cover part according to claim 10 wherein the connector part is configured to be operated in an identification state for sensing a resistor element value included in the identification unit.

12. An exchangeable cover part comprising:
    electrical circuitry for supporting a user interface of a wireless terminal releasably attached to the exchangeable cover part;
    an electrical connector part for electrically connecting the electrical circuitry to the wireless communication terminal; and
    an illumination unit supported by the electrical circuitry,
    wherein the electrical circuitry is configured to cause the illumination unit to illuminate based upon a ringing signal received from the wireless terminal through the electrical connector part.

13. An exchangeable cover part comprising:
    a user input device;

electrical circuitry for detecting operation of the user input device and for producing a signal indicative of the detected operation of the user input device;

an electrical connector for electrically connecting the electrical circuitry to a wireless communication terminal releasably attached to the exchangeable cover part, wherein the electrical connector is configured to transmit the signal to the wireless communication terminal; and an identification unit configured to identify the user exchangeable cover part, the identification unit comprising a circuit element having a circuit element value, wherein the electrical connector is further configured to be operated in an identification state for sensing the circuit element value included in the identification unit for identifying the user exchangeable cover part.

14. An exchangeable cover part according to claim 13, wherein the user input device comprises at least one of a touchpad, touch screen, keypad, or joystick.

15. An exchangeable cover part according to claim 13, wherein the electrical circuitry comprises a processor for processing the detected operation of the user input device and for outputting the signal indicative of the detected operation of the user input device.

16. An exchangeable cover part according to claim 13, wherein the electrical connector comprises a plurality of connector pins.

17. An exchangeable cover part according to claim 13 wherein the identification unit comprises a resistor element having a resistor element value.

18. An exchangeable cover part comprising:

electrical circuitry for supporting a user interface of a wireless communication terminal releasably attached to the exchangeable cover part; and an electrical connector for transmitting data between the electrical circuitry and the wireless communication terminal;

wherein the electrical circuitry comprises a memory device containing data to be downloaded to the wireless communication terminal via the electrical connector for execution by the wireless communication terminal; and wherein the data to be downloaded includes gaming executables.

19. An exchangeable cover part according to claim 18, wherein the electrical circuitry comprises a processor configured to process data contained in the memory device.

20. An apparatus for operating electrical circuitry included in a user exchangeable cover part that is electrically interconnected to a wireless terminal by an electrical connector, the apparatus comprising:

means for identifying a class of the user exchangeable cover part; and means for operating the electrical circuitry of the user exchangeable cover part in dependence upon an identification of the user exchangeable cover part, wherein the electrical circuitry that is operated in dependence upon the identification of the user exchangeable cover part comprises circuitry for supporting a user interface of a wireless terminal and circuitry in addition to or other than circuitry included within a display screen of the user interface, and wherein the electrical connector has a plurality of pins, and at least one of the connector pins is operated in an identification state for sensing a circuit element value included in the means for identifying which is configured to identify the class of the user exchangeable cover part and which is part of the user exchangeable cover part, and afterwards is operated in an operation state for transferring electrical signals between the wireless terminal and the electrical circuitry of the user exchangeable cover part.

21. An apparatus according to claim 20 wherein at least one of the connector pins is configured to be operated in an identification state for sensing a resistor element value included in the means for identifying.

* * * * *